(12) United States Patent
Knight

(10) Patent No.: X9677
(45) Date of Patent: May 23, 1836

(54) BUILDINGS, STORES, &C.

(76) Inventor: Isaac Knight

Isaac Knight
Letters Patent

The schedule referred to in these Letters Patent and mak-
ing part of the same containing a description in the words of the
said Isaac Knight himself of his improvements in the
mode of constructing stores and other buildings —
A Specification of an improvement in building houses in-
vented by Isaac Knight of the City of Baltimore which
improvement he believes to be new and useful and for which he
asks a patent: — My leading object is to introduce a mode of
building storehouses more suited to the present state of our
cities by making the exterior of the building really fire
proof. The means he proposes for doing this is to construct
the front principally of cast iron, with an earthen roof,
or an incombustible covering for the attick floor. Such
building being so constructed that the cost will be little
or no more than upon the present plan. The principle
objection made to cast iron in connection with masonry,
has been the expansion and contraction of the metal. To pre-
vent it is beyond the reach of art: all that can be done is
to avoid the bad effects of it which he proposes to do. Gran-
ite pillars are found not to answer in case of fire as when
they become hot they burst asunder, and the building falls.
Instead of granite he makes the pillars of cast iron hollow
with three sides generally about ¾ of inch thick, the inner
side to be open but with flanges at the corners turned
nearly in the form of the letter E: so that they may be built
up sollid with brick or soap stone to within one inch of
the top of the cast iron case. then he places a block of cast
iron which may be about two inches in thickness made to
fit the inside of the top of the case and on the brick work
so the whole weight will rest upon the brick within the
pillars pillar and leave a space of about one inch free to give room for
the metal of the case to expand and contract. The cap of the
pillar must have flanges extending down the outside of the
pillars two or three inches so as to receive the top of the
cast-iron case or pillar. The lintels or bresummer which
rests on the cap of the pillar he also forms of cast iron with a
front and bottom nearly in the form of the letter L. the
front above 9 inches in width and one inch in thickness. the bot
tom one inch thick and one foot wide. There must be a
flange at the top to throw the water off. This may also be
filled with bricks and when it is intended that the joists
are to rest on these lintels or bresummers and run from front
to back of the house he then casts a rebate or chain on the in-
side of the lintel to receive and hold the joists and tie the build-
ing. The second story he forms in the same manner as the
first, if it is intended to have the whole space between the
pillars taken up with doors and windows as below, but if
not he then makes the pillars of about one half the size of
those in the first story say six inches front by 12 or 18 in
depth; and places two above for one below, also filled with
bricks, and with a block of cast iron on these top to
accommodate the expansion as before stated and so arrang
ed as that they will answer for the door and window frames
and the space between these pillars, and doors or windows
which are called piers, and the space below the windows
he also closes up with plates of cast iron of about 1/2 inch in
thickness and of sufficient length and breadth to fit in
grooves which are cast for that purpose in the pillars,
these cast iron plates may be made to give the appearance
of pannel work or other wise ornamented according to fancy,
The 3<sup>d</sup> & 4<sup>th</sup> story is also formed of cast iron in the same
manner; The window shutters ought to be of rolled iron
as also the doors which should be made to move upon
pivot pivot hinges steeled at their bottoms or he sometimes places
the doors in grooves in such a way that they will slide up
and down in them by means of a ballance weight passing
over pullies. The roof he in general makes nearly flat with-
out rafters, but places joists on the walls nearly similar to
the floor joists, on these joists he puts a floor of rough boards
then a layer of Roman Cement in which he lays a pave-
ment of pressed brick of about two inches in thickness the
joints very small and well filled with water cement liquid
lead or other suitable materials which if properly done
will cement the whole together water tight. then over this pave-
ment of brick so cemented together with lead or otherwise
he puts several coats of tar well mixed with ashes lime clay or
fine sand in sufficient quantity to render the tar incom-
bustible, upon this floor a reservoir if required may be for-
med upon the roof of the house to hold the water falling upon
it. This may be done by raising the coping - stones of the
wall (which stone constitute the outer edge of the roof) to
allow these stones to project a few inches above or higher than
the pavement of the roof so as to confine the water which may
fall on it, and which may be drawn off at pleasure by
means of spouts with valves fixed near the roof having wires at-
tached to them, by which they are opened which wires ex-
tend down to a convenient discharging place in the
spout, there ought to be a pallisading of cast iron fixed
in the coping stones of the wall both for ornament and safety
Another mode of securing the house from fire is this. if it
be not desired to have a roof of the kind last described or
which will not be entirely fire proof. he then puts one
or more courses of bricks between the top of the joists of the
upper or garret floor and the plate of wood on which the
foot of the rafters are secured and then to lay a pavement
of brick with suitable cement, or some other incombustible ble material over the garret floor, so as that no fire can be communicated from the roof to the floor or joist, and thus in case the roof should take fire and burn off, the other parts of the building would be safe. (There ought to be an iron trap door over the stair (way)) this would add greatly to the security of property in store houses, and at very small cost and might be applied to houses already built with wooden roofs. What I claim as new in my improved mode of building stores and similar structures is the rendering them wholly or in great degree fire proof in the manner herein described, that is to say, the constructing the columns which support the front in part of brick or some similar material and in part of cast iron, allowing the weight to rest upon cast iron blocks placed in the iron case and on the brick in such a way that the iron forming the sides may expand and contract freely by changes of temperature, the superincumbent weight being borne by the bricks which form the interior of the columns. My claim is to the manner of allowing the iron case to expand and contract as herein set forth. I also claim the manner of forming the front of the house above the columns as herein before set forth. I also claim the forming of the roof with thin paving brick cemented together in the way described and in connection with a covering upon the brick pavement of tar sand ashes or lime or some similar compound. I likewise claim the covering the upper floor with brick or some other incombustible substance in connection with there being also two or more courses of brick laid above the joists of the floor so as to elevate the raising plate upon which the rafters rest and prevent its having any communication by combustible materials with the joists or floor so that the roof might burn off without endangering the lower parts of the building care being always taken to close the head of the stair way or the opening into the loft by a metal door.

Isaac Knight

Witnesses Gilbert S. Gibson. Saml. [illegible]